No. 792,816. Patented June 20, 1905.

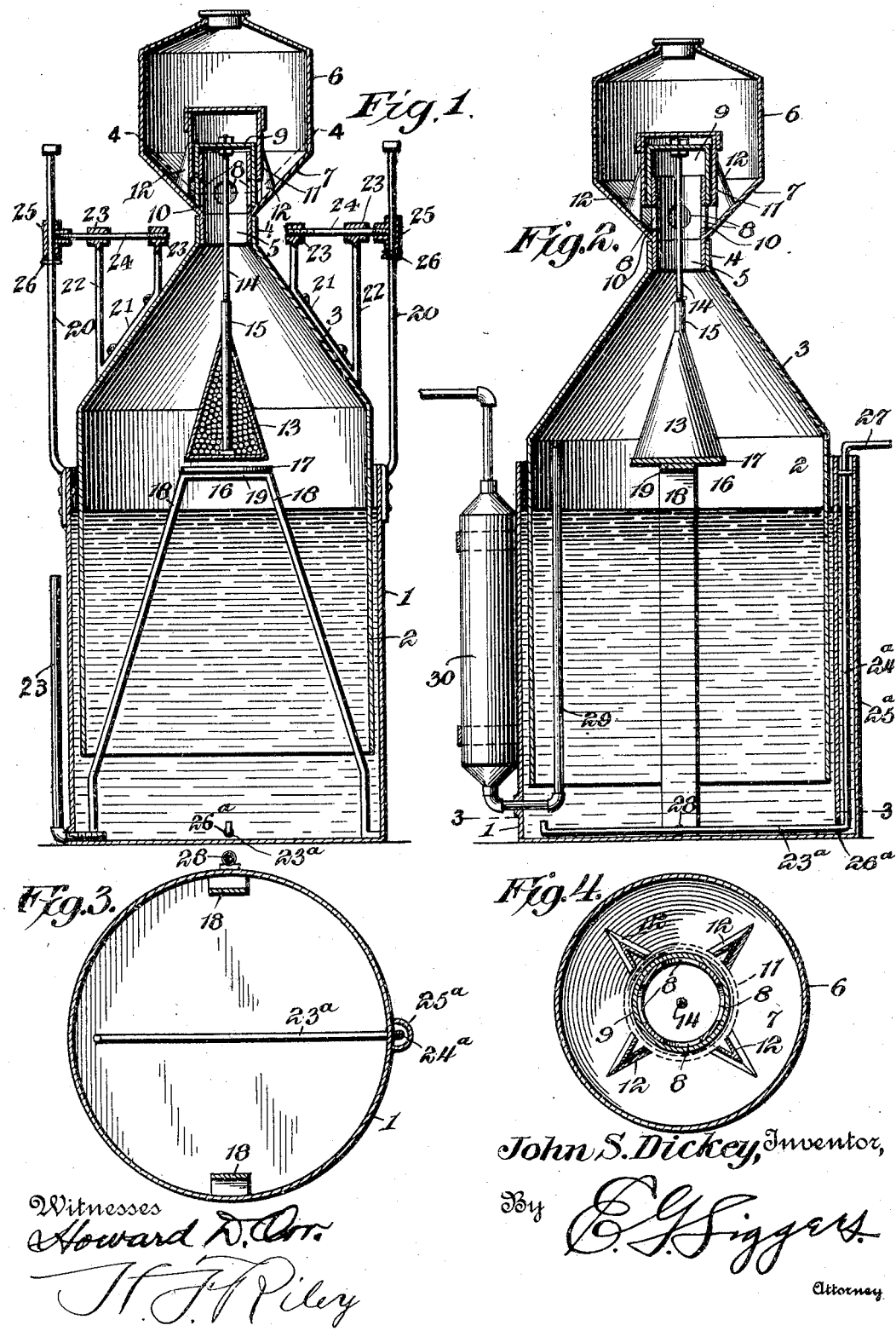

UNITED STATES PATENT OFFICE.

JOHN SPLANN DICKEY, OF COLLINSVILLE, TEXAS.

ACETYLENE-GAS GENERATOR.

SPECIFICATION forming part of Letters Patent No. 792,816, dated June 20, 1905.

Application filed August 19, 1904. Serial No. 221,410.

*To all whom it may concern:*

Be it known that I, JOHN SPLANN DICKEY, a citizen of the United States, residing at Collinsville, in the county of Grayson and State of Texas, have invented a new and useful Acetylene-Gas Generator, of which the following is a specification.

The invention relates to improvements in acetylene-gas generators.

The object of the present invention is to improve the construction of acetylene-gas generators and to provide a simple and comparatively inexpensive one capable of automatic operation to feed the carbid when the supply of gas falls below a predetermined quantity and to shut off the supply of carbid when the volume of gas generated by the machine reaches a predetermined point.

A further object of the invention is to provide an automatically-operable valve or cut-off adapted to control the discharge of carbid from the hopper and capable of being readily locked in its closed position for cutting out the hopper when it is desired to recharge it.

Another object of the invention is to enable the carbid to be automatically scattered over the surface of the water and to enable the accumulation at the bottom of the machine to be readily agitated, whereby the carbid will be completely subjected to the action of the water.

With these and other objects in view the invention consists in the construction and novel combination and arrangement of parts hereinafter fully described, illustrated in the accompanying drawings, and pointed out in the claims hereto appended, it being understood that various changes in the form, proportion, size, and minor details of construction within the scope of the claims may be resorted to without departing from the spirit or sacrificing any of the advantages of the invention.

In the drawings, Figure 1 is a vertical sectional view of an acetylene-gas generator constructed in accordance with this invention, the bell being supported in a partially-elevated position for retaining the valve or cut-off in its closed position to cut out the hopper. Fig. 2 is a vertical sectional view taken at right angles to Fig. 1, the valve or cut-off being open. Fig. 3 is a horizontal sectional view on the line 3 3 of Fig. 2. Fig. 4 is a similar view on the line 4 4 of Fig. 1.

Like numerals of reference designate corresponding parts in all the figures of the drawings.

1 designates a cylindrical casing open at the top and receiving a vertically-movable bell 2, which is composed of a cylindrical lower portion and a tapered or conical upper portion 3. The tapered upper portion of the bell is provided with a projecting neck 4, which receives the lower depending end of a vertical discharge-tube 5 of a carbid-hopper 6, which is mounted on the bell, as clearly illustrated in Figs. 1 and 2 of the drawings. The carbid-hopper 6, which is provided with a cylindrical body portion, has a tapered lower portion 7 for directing carbid into the bell. The tube 5, which fits within the neck, extends upwardly through the lower end of the hopper and projects above the lower edge of the inclined portion or bottom 7 of the same, and it is provided with a plurality of discharge-openings 8, through which the carbid passes when a valve or cut-off 9 is opened, as illustrated in Fig. 2 of the drawings. The outlet-openings 8 are located slightly above the lower end of the inclined or tapered bottom of the hopper, and the upper portion of the tube and the inclined bottom of the hopper form a valve-seat 10, which is in the form of a crotch, as shown. The valve or cut-off, which consists of a cylindrical cap, slides freely on and fits over the upper portion of the tube 5, which constitutes a discharge-passage or outlet for the hopper. When the valve or cut-off is at the limit of its downward movement, as illustrated in Fig. 1 of the drawings, its lower edges fit snugly on the seat and it covers the openings of the discharge-tube 5 of the hopper and cuts off the feed of the carbid.

In order to prevent the carbid within the hopper from interfering with the operation of the valve, an approximately cylindrical guard or shield 11 is provided. This guard or shield, which is spaced from the valve-seat, snugly receives the valve and is supported by a plurality of webs or flanges 12, suitably connected with the exterior of the guard or shield and with the inclined lower portion or bottom of the hopper. The webs or flanges are approximately V-shaped in cross-section, as clearly shown in Fig. 4, and the angularly-disposed sides are arranged to direct the carbid toward the apertures of the discharge-tube 5. The guard or shield has its lower edges arranged approximately in the same planes as the tops of the apertures 8 of the discharge-tube. The top of the guard or shield is located a sufficient distance above the vertically-movable cylindrical or tubular valve to permit the necessary movement of the latter. The guard or shield prevents the carbid from accumulating on the valve and interfering with the free movement thereof.

In order to render the operation of the valve positive and automatic, a combined weight and deflector 13 is connected with the valve and is arranged to positively open and close the same. The combined weight and deflector 13, which preferably consists of a conical receptacle, is filled with shot or other weighty substances and is attached to the lower end of a vertical valve stem or rod 14, which has its upper end secured to the top of the valve. The weighted conical deflector, which is located centrally beneath the valve, is provided with a tube 15, extending upward from the bottom of the conical receptacle and receiving the lower portion of the rod or stem, which may, as illustrated in the accompanying drawings, be threaded into the tube; but it may be secured to the same in any other desired manner. Also the conical deflector may be weighted in any other manner, as will be readily understood. The bell is partially immersed in the water within the casing 1 in the usual manner, as illustrated in Figs. 1 and 2 of the drawings, and when the bell is at or near the limit of its downward movement the conical or tapering deflector and weight rests upon a support 16, with the valve in its open position, as illustrated in Fig. 2 of the drawings. The carbid is then permitted to discharge freely into the lower portion of the machine, and when sufficient gas accumulates within the bell to raise the same the bell and the hopper will be moved upward until the combined deflector and weight is lifted off the stand or support, which will result in closing the valve and shutting off the feed of the carbid. The bell and the hopper will remain in such elevated position until the gas is consumed, and when the bell descends sufficiently to permit the combined deflector and weight to rest upon the support the valve will be again opened and carbid will be discharged into the lower portion of the generator. By this construction a positive automatic operation is secured. The support or stand is provided with a circular top 17, and it has legs 18 suitably secured to the top and to the bottom of the casing 1, the legs being preferably constructed of a single piece of metal bent at the center to form an intermediate connecting portion 19, which is secured to the top 17; but any other form of support may be provided, as will be readily understood. As the conical deflector is located centrally beneath the valve, the carbid discharged from the tube 5 in falling strikes against the inclined faces of the deflector and is thrown upward away from the center of the machine to distribute the carbid over the surface of the water and to prevent the bubbles from rising into the mouth of the discharge-tube and choking the device.

The bell is guided in its vertical movement by vertical rods 20, mounted on the exterior of the casing 1 and extending upward therefrom, as clearly shown in Fig. 1. The bell is provided on opposite sides with brackets, each of which is constructed as follows: A base-piece 21 is riveted or otherwise secured upon the inclined portion of the bell and carries upstanding standards 22, terminating in horizontally-disposed eyes 23, the inner one being preferably threaded. A horizontal supporting-rod 24 passes through the eyes and is threaded into the inner one, said rod carrying at its outer end a sleeve 25, that slidably receives the adjacent guide-rod 20. The guide-rods are provided with perforations for the reception of keys or pins 26, adapted to support the bell in an elevated position for holding the combined weight and deflector away from the support or standard, whereby the valve will be held firmly in its closed position when it is desired to recharge the hopper. The hopper is provided with a filling-opening and a suitable closure therefor.

In order to enable the ash at the bottom casing to be agitated to subject it completely to the action of the water, an oscillatory agitator 23$^a$ is provided. This agitator consists of a horizontal arm arranged on the bottom of the casing 1 and a vertical shaft or stem 24$^a$, located within a well 25$^a$, which communicates at the bottom with the interior of the casing by an aperture 26$^a$ and which forms a water seal. The vertical shaft, which is journaled in suitable bearings, is provided at its upper end with a handle 27 for enabling it to be readily oscillated. The horizontal arm of the agitator operates between the legs of the stand or support and is adapted to thoroughly agitate any accumulation at the bottom of the casing, so that the carbid will be completely subjected to the action of the water. A suitable tube 28, which is connected with the lower portion of the casing 1, is provided for the discharge of the residuum. A gas-pipe 29, which extends to a point above the surface of the water, is provided, and a suitable filter 30 is preferably employed for cleaning the gas. The gas-pipe and the discharge-pipe are designed to provide for a suitable controlling-valve; but as these do not constitute any portion of the present invention illustration and description thereof are unnecessary.

Having thus fully described my invention, what I claim as new, and desire to secure by Letters Patent, is—

1. In a machine of the class described, the combination with a casing, and a bell, of a hopper movable with the bell and provided with a discharge-tube extending into it, a tubular valve fitted over the discharge-tube, a combined deflector and weight located beneath the discharge-tube, and means extending through the discharge-tube for connecting the valve with the combined weight and deflector.

2. In a machine of the class described, the combination with a casing, and a bell, of a hopper, a discharge-tube extending into the hopper, a valve consisting of a cap fitted on the discharge-tube and arranged within the hopper, a guard or shield receiving the valve, and means for operating the valve.

3. In a machine of the class described, the combination with a casing, and a bell, of a hopper, a discharge-tube extending into the hopper, a valve consisting of a cap fitted on the discharge-tube and arranged within the hopper, a guard or shield consisting of a superimposed cap receiving the valve, and means for operating the latter.

4. In a machine of the class described, the combination of a hopper having an inwardly-extending discharge-tube provided within the hopper with apertures, a tubular valve for controlling the discharge of carbid, said valve working over the said tube, a superimposed guard or shield receiving the valve, and webs or flanges supporting the guard or shield and provided with angularly-disposed sides arranged to direct the carbid to the apertures of the discharge-tube.

In testimony that I claim the foregoing as my own I have hereto affixed my signature in the presence of two witnesses.

JOHN SPLANN DICKEY.

Witnesses:
  P. N. WATTS,
  N. B. JOHN.